United States Patent
Hoshihara et al.

(10) Patent No.: US 9,327,616 B2
(45) Date of Patent: May 3, 2016

(54) VEHICLE SEAT SLIDING APPARATUS

(71) Applicant: AISIN SEIKI KABUSHIKI KAISHA, Kariya-shi (JP)

(72) Inventors: Naoaki Hoshihara, Obu (JP); Akihiro Chiba, Anjo (JP); Shun Fujishiro, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 74 days.

(21) Appl. No.: 14/182,471

(22) Filed: Feb. 18, 2014

(65) Prior Publication Data

US 2014/0232157 A1  Aug. 21, 2014

(30) Foreign Application Priority Data

Feb. 19, 2013  (JP) ................................. 2013-030099

(51) Int. Cl.
*F16M 13/00* (2006.01)
*B60N 2/08* (2006.01)
*B60N 2/07* (2006.01)

(52) U.S. Cl.
CPC ............ *B60N 2/0856* (2013.01); *B60N 2/0705* (2013.01); *B60N 2/085* (2013.01); *B60N 2/0818* (2013.01)

(58) Field of Classification Search
CPC ..... B60N 2/0705; B60N 2/0818; B60N 2/085
USPC .......................... 248/424, 429, 419, 423, 430; 297/344.1; 296/65.13
See application file for complete search history.

(56) References Cited

U.S. PATENT DOCUMENTS

| | | | | |
|---|---|---|---|---|
| 7,314,204 | B2 * | 1/2008 | Kohmura | 248/430 |
| 7,717,392 | B2 * | 5/2010 | Sakakibara et al. | 248/429 |
| 2008/0231101 | A1 | 9/2008 | Sakakibara et al. | |
| 2009/0218843 | A1 | 9/2009 | Wojatzki et al. | |
| 2012/0032060 | A1 | 2/2012 | Suzuki et al. | |
| 2012/0132777 | A1 | 5/2012 | Nakamura et al. | |
| 2012/0318948 | A1 * | 12/2012 | Yamada et al. | 248/429 |

FOREIGN PATENT DOCUMENTS

| | | | |
|---|---|---|---|
| JP | 2010-100077 | | 5/2010 |
| JP | 2012-35777 | | 2/2012 |
| JP | 2013018400 A | * | 1/2013 |

OTHER PUBLICATIONS

U.S. Appl. No. 14/182,450, filed Feb. 18, 2014, Hoshihara, et al.
Extended European Search Report issued Jun. 2, 2014 in Patent Application No. 14155668.8.

* cited by examiner

*Primary Examiner* — Kimberly Wood

(74) *Attorney, Agent, or Firm* — Oblon, McClelland, Maier & Neustadt, L.L.P.

(57) ABSTRACT

A vehicle seat sliding apparatus includes: a first rail fixed to one of a vehicle floor and a seat and having first vertical wall portions, a first connection wall portion, and flanges; and a second rail fixed to the other one of the vehicle floor and the seat and having second vertical wall portions, a second connection wall portion, outward extending wall portions, and extending wall portions, wherein locking claws are aligned side by side at tip ends of the flanges of the first rail; the second rail is provided with through-holes; the vehicle seat sliding apparatus further includes, a locking member having locking portions, and a biasing member; and the outward extending wall portions are provided with flat portions.

3 Claims, 11 Drawing Sheets

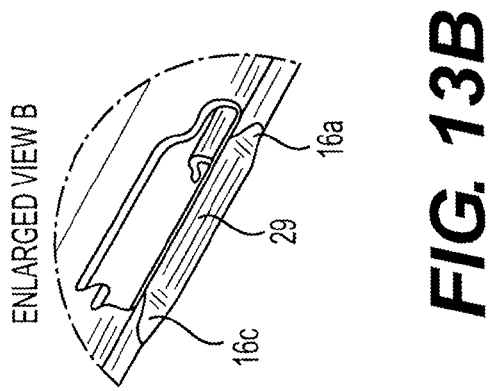
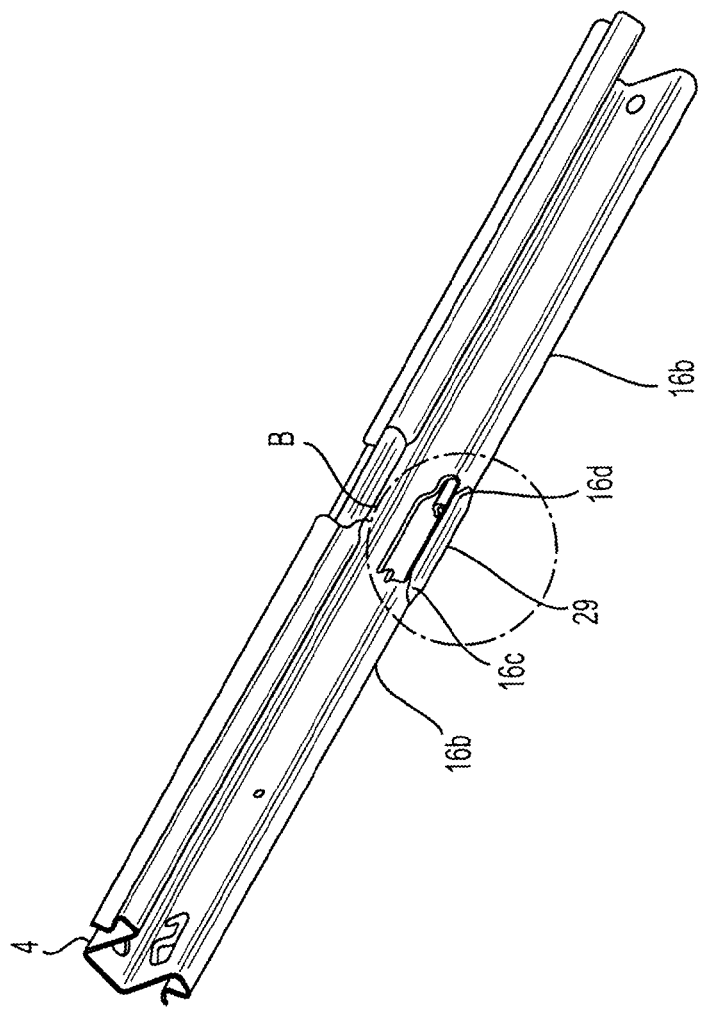

VEHICLE SEAT SLIDING APPARATUS

CROSS REFERENCE TO RELATED APPLICATIONS

This application is based on and claims priority under 35 U.S.C. §119 to Japanese Patent Application 2013-030099, filed on Feb. 19, 2013, the entire contents of which are incorporated herein by reference.

TECHNICAL FIELD

This disclosure relates to a vehicle seat sliding apparatus.

BACKGROUND DISCUSSION

JP 2010-100077A (Patent Literature 1) discloses a vehicle seat sliding apparatus in the related art. As is shown in FIG. 9, the vehicle seat sliding apparatus 100 includes a lower rail 110 fixed to a vehicle floor and an upper rail 120 fixed to a seat and connected to the lower rail 110 in a relatively movable manner.

The lower rail 110 has a bottom wall 111, a pair of vertical walls 112 extending upward from both ends of the bottom wall 111 in a width direction, and a pair of flanges 113 projecting from upper ends of the vertical walls 112 inwardly in the width direction in which the flanges face each other and further bending toward lower ends of the vertical walls 112. A plurality of locking claws 113a are provided side by side in a direction of the relative movement (a direction perpendicular to the sheet surface of FIG. 9) at tip ends of the respective flanges 113.

On the other hand, the upper rail 120 has a top wall 121 fixed to a lower surface of the seat, a pair of vertical walls 122 extending downward from both ends of the top wall 121 in the width direction, a pair of outward extending wall portions 123 extending outward in the width direction diagonally from lower ends of the vertical walls 122, and a pair of extending wall portions 124 extending in a top-bottom direction from outer ends of the outward extending wall portions 123 in the width direction so as to be surrounded by the bottom wall 111 and the flanges 113. At a predetermined position in the direction of the relative movement, the upper rail 120 is provided with through-holes 125 in lower end portions of the respective vertical walls 122 and the respective extending wall portions 124 including the respective outward extending wall portions 123 entirely. In short, the upper rail 120 is opened downward by the through-holes 125.

A lock lever 130 connected to the upper rail 120 in a rotationally movable manner about an axis line extending in the width direction is disposed in a space defined between the lower rail 110 and the upper rail 120. The lock lever 130 has a lock lever 131 allowed to pass through the through-holes 125 in the width direction. When the lock lever 130 is biased by a biasing member (not shown), the lock plate 131 rises and the locking claws 113a of the lower rail 110 fit into locking portions 131a in the shape of rectangular holes provided to the lock plate 131. A movement of the upper rail 120 with respect to the lower rail 110 is thus locked. Contrarily, the locking of the movement of the upper rail 120 with respect to the lower rail 110 is unlocked when the lock plate 131 comes down against a biasing force of the biasing member by an operation force of an operation member (not shown) so that the locking claws 113a come off the locking portions 131a.

In Patent Literature 1, however, the through-holes 125 provided to the upper rail 120 inevitably deteriorate strength of the upper rail 120. Such deterioration of strength of the upper rail 120 becomes more noticeable with an increase of the opening area of the through-holes 125. It is therefore preferable to reduce the opening area of the through-holes 125. On the other hand, when the opening area of the through-holes 125 is reduced, a rotationally movable range (stroke) of the lock lever 130 is reduced, too, and a selective locking operation of a relative movement of the lower rail 110 and the upper rail 120 by the lock lever 130 may possibly become unstable.

SUMMARY

Thus, a need exists for a vehicle seat sliding apparatus which is not suspectable to the drawback mentioned above.

An aspect of this disclosure provides a vehicle seat sliding apparatus including: a first rail fixed to one of a vehicle floor and a seat and having a pair of first vertical wall portions aligned side by side in a width direction, a first connection wall portion connecting base ends of the first vertical wall portions, and a pair of flanges projecting from tip ends of the first vertical wall portions inwardly in the width direction in which the flanges face each other and further bending toward the base ends of the first vertical wall portions; and a second rail fixed to the other one of the vehicle floor and the seat in a relatively movable manner with respect to the first rail and having a pair of second vertical wall portions aligned side by side in the width direction between the flanges, a second connection wall portion connecting base ends of the second vertical wall portions, a pair of outward extending wall portions projecting outward apart from each other in the width direction from tip ends of the second vertical wall portions while undergoing displacement to one side in a top-bottom direction, and a pair of extending wall portions extending in the top-bottom direction from tip ends of the outward extending wall portions so as to be surrounded by the first vertical wall portions and the flanges. A plurality of locking claws are aligned side by side in the direction of the relative movement at tip ends of the flanges of the first rail. The second rail is provided with a pair of through-holes penetrating the second vertical wall portions in the width direction and penetrating the outward extending wall portions in the top-bottom direction. The vehicle seat sliding apparatus further includes: a locking member connected to the second rail in a rotationally movable manner about an axial line extending in the width direction on an inner side of the second vertical wall portions in the width direction, formed in an insertable manner into the through-holes in the second vertical wall portions, having locking portions capable of locking at least a part of the locking claws in side edge portions in the width direction, and selectively locking the relative movement of the first and second rails as the locking portions fit onto and come off the locking claws in association with a rotational movement in the top-bottom direction; and a biasing member biasing and rotating the locking member to a side where the relative movement is locked. The outward extending wall portions are provided with a pair of flat portions making a region between outer ends of the outward extending wall portions in the width direction and the through-holes horizontally in the width direction so that an abutment position of the outward extending wall portions and the locking member in association with a rotational movement of the locking member comes closer to the first connection wall portion in the top-bottom direction.

According to this configuration, a rotational movement of the locking member to the side for the locking of the relative movement to be unlocked is limited to the extent that the locking member abuts on the flat portions. The abutment position of the outward extending wall portions and the locking member in association with the rotational movement of the locking member falls on a position relatively closer to the first connection wall portion in the top-bottom direction than the flat portions. In this case, for example, even when the locking member cannot pass through the through-holes in the top-bottom direction, the rotationally removable range of the locking member can be increased. It thus becomes possible to suppress deterioration of strength of the second rail caused by the through-holes while suitably securing the rotationally movable range of the locking member.

This disclosure has an advantage that it becomes possible to suppress deterioration of strength of a rail caused by through-holes while suitably securing a rotationally movable range of the locking member.

BRIEF DESCRIPTION OF THE DRAWINGS

The foregoing and additional features and characteristics of this disclosure will become more apparent from the following detailed description considered with the reference to the accompanying drawings, wherein:

FIG. 13*a* is a perspective view with an enlarged portion (FIG. 13*b*) of an embodiment of the present application.

DETAILED DESCRIPTION

An embodiment of a vehicle seat sliding apparatus disclosed here will be described. Hereinafter, a front-rear direction of a vehicle is referred to as the front-rear direction.

Figure 1:
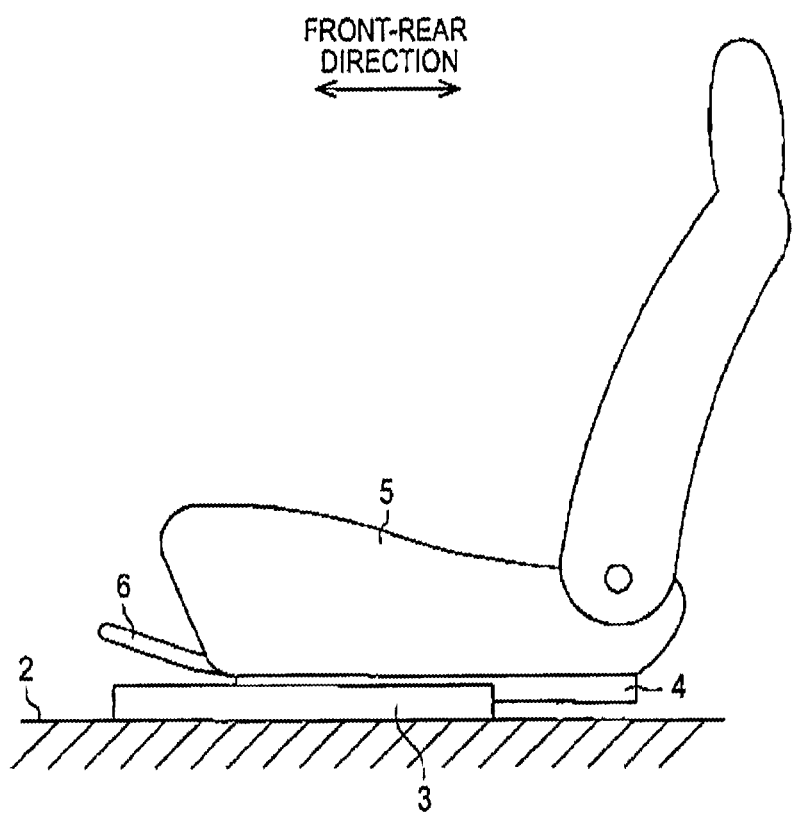
FIG. 1 is a side view of a vehicle seat to which this disclosure is applied.

As is shown in FIG. 1, a lower rail 3 as a first rail is fixed to a vehicle floor 2 so as to extend in the front-rear direction and an upper rail 4 as a second rail is attached to the lower rail 3 in a relatively movable manner in the front-rear direction with respect to the lower rail 3. In other words, a longitudinal direction (relative movement direction) of the lower rail 3 and the upper rail 4 coincides with the front-rear direction in the embodiment.

It should be noted that each of the lower rail 3 and the upper rail 4 is disposed in pairs in a width direction (a direction perpendicular to the sheet surface of FIG. 1) and those disposed on the left facing the front are shown here. A seat 5 forming a passenger's seating portion is fixed to and supported on the upper rails 4. A relative movement of the lower rails 3 and the upper rails 4 is basically in a locked state and an unlocking handle 6 to unlock this locked state is provided.

Figure 2:
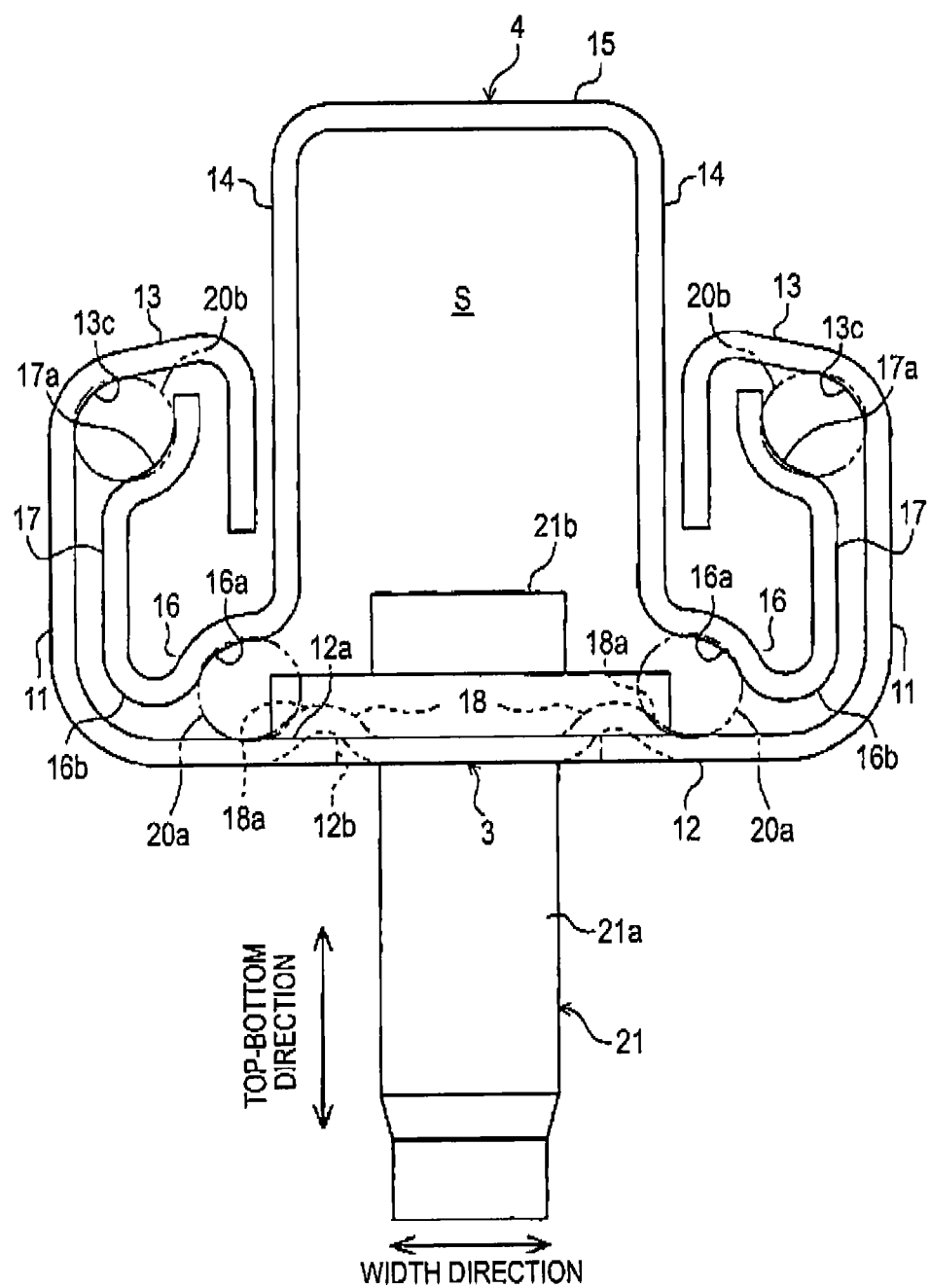
FIG. 2 is a front view of an embodiment disclosed here.

As is shown in FIG. 2, the lower rail 3 is formed of a plate material and has a pair of first vertical wall portions 11 extending in a top-bottom direction on the both sides in the width direction and a bottom wall portion 12 as a first connection wall portion connecting base ends (lower ends) of the first vertical wall portions 11. A pair of flanges 13 are formed continuously from tip ends (upper ends) of the first vertical wall portions 11 so as to project inwardly in the width direction in which the flanges face each other and further bend toward the base ends of the first vertical wall portions 11.

A connection region of each flange 13 to the first vertical wall portion 11 forms a first upper ball guide 13*c* of substantially an arc shape in cross section that protrudes outward and diagonally upward. On the other hand, a pair of ridges 18 aligned side by side in the width direction are provided integrally with the bottom wall portion 12 so as to extend in the front-rear direction. The ridges 18 extend in the bottom wall portion 12 across an entire intermediate portion in the front-rear direction excluding the front end and the rear end. A region of each ridge 18 on the outer side than the apex in the width direction forms a first lower ball guide 18*a* as a first ball guide of substantially an arc shape in cross section that protrudes inward and diagonally downward.

The front end of the bottom wall portion 12 where the ridges 18 (first lower ball guides 18*a*) are not formed expands in a planar shape so that a position in the top-bottom direction is constant in the width direction and thereby forms an attaching portion 12*a*. The attaching portion 12*a* forms a seating surface for a fastening bolt 21 as a fastening member that fixes the lower rail 3 to the vehicle floor 2 and is provided with a substantially circular bolt insertion hole 12*b* penetrating a center portion in the top-bottom direction.

A bolt portion 21*a* of the fastening bolt 21, an axial line of which extends in the top-bottom direction, is inserted into the bolt insertion hole 12*b*. The fastening bolt 21 integrally has a flanged head portion 21*b* protruding upward from the upper end of the bolt portion 21*a*. The lower rail 3 is fixed to the vehicle floor 2 by inserting the bolt portion 21*a* of the fastening bolt 21 into the bolt insertion hole 12*b* and tightening the fastening bolt 21 into a nut hole (not shown) in the vehicle floor 2 until the head portion 21*b* of the fastening bolt 21 abuts on a peripheral portion of the bolt insertion hole 12*b*.

The same applies to the rear end of the bottom wall portion 12 where the ridges 18 (first lower ball guides 18*a*) are not formed (the illustration is omitted here).

Figure 3A:
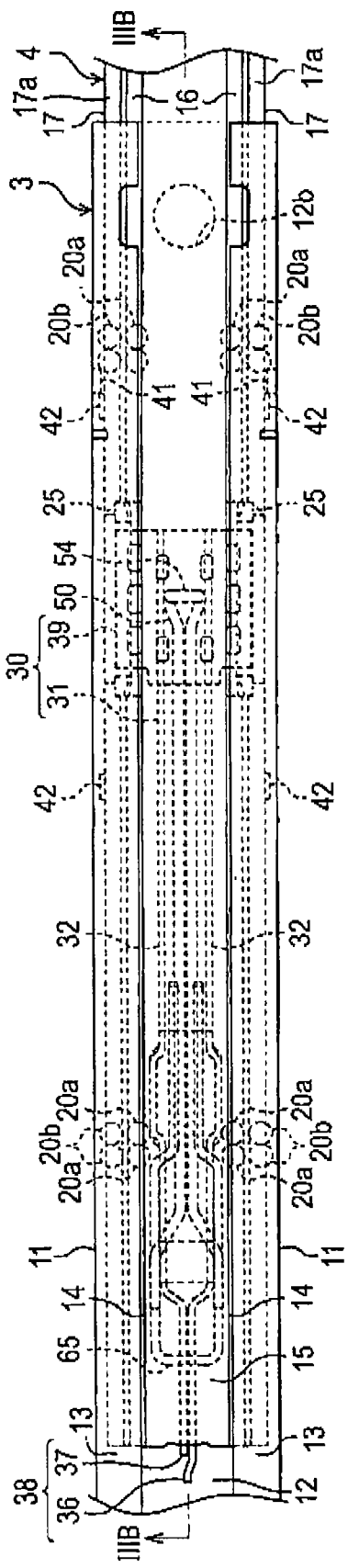
FIG. 3A is a plan view of the embodiment disclosed here and FIG. 3B is a cross-sectional view taken IIIA-IIIA line in FIG. 3A.

As is shown in FIG. 3A, each first vertical wall portion 11 is provided with a pair of first stoppers 41 at the front end and also at the rear end (FIG. 3A shows only the first stoppers 41 at the rear end). The first stoppers 41 of the first vertical wall portions 11 are disposed symmetrically in the width direction and formed so as to protrude inward oppositely to each other in the width direction.

Figure 3B:
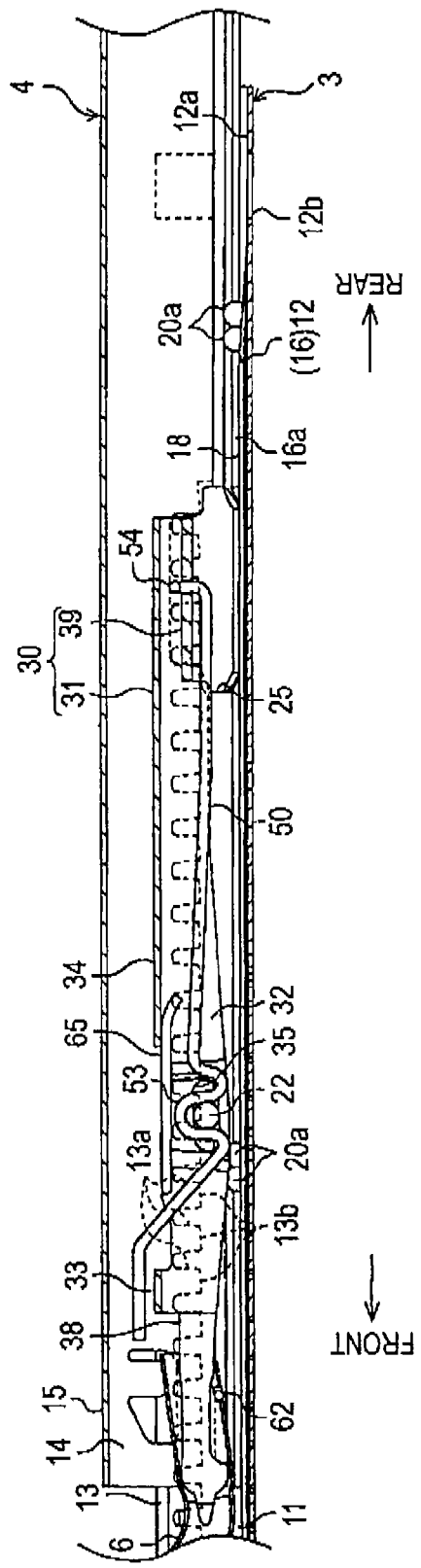

Also, as is shown in FIG. 3B, in an intermediate portion in the longitudinal direction of each flange 13 of the lower rail 3, a plurality of notches 13*a* are formed upward from the tip end (lower end) at regular intervals in the longitudinal direction and a locking claw 13*b* in the shape of a rectangular tooth is formed between every pair of the adjacent notches 13*a*. Hence, the plurality of locking claws 13*b* are aligned side by side at the regular intervals in the longitudinal direction of the lower rail 3.

As is shown in FIG. 2, the upper rail 4 is formed of a plate material and has a pair of second vertical wall portions 14 extending in the top-bottom direction between the flanges 13 of the lower rail 3 and a lid wall portion 15 as a second connection wall portion connecting base ends (upper ends) of the second vertical wall portions 14 away from the lower rail 3. A pair of outward extending wall portions 16 are continuously formed from the tip ends (lower ends) of the second vertical wall portions 14 in proximity to the bottom wall portion 12 so as to project outward apart from each other in the width direction while coming closer to the bottom wall portion 12 in the top-bottom direction. Also, a pair of extending wall portions 17 extending in the top-bottom direction so as to be surrounded by the first vertical wall portions 11 and the flanges 13 are continuously formed from the tip ends (outer ends 16b in the width direction) of the outward extending wall portions 16.

In other words, the lower rail 3 and the upper rail 4 have U-shaped rail cross sections butted against each other on the opening side and are prevented from falling off in the top-bottom direction chiefly by engagement between the flanges 13 and the extending wall portions 17. A rail cross section formed by the lower rail 3 and the upper rail 4 is of so-called a rectangular box shape. The lower rail 3 defines a space S in cooperation with the upper rail 4.

The inner portion of each outward extending wall portion 16 in the width direction forms a second lower ball guide 16a as a second ball guide having substantially an arc-shaped cross section protruding outward and diagonally upward. The second lower ball guides 16a are located on the outer side in the width direction than the first lower ball guides 18a. More specifically, the first lower ball guides 18a are formed in the bottom wall portion 12 substantially directly below the second vertical wall portions 14 so as to protrude in the top-bottom direction in a direction in which the first lower ball guides 18a come closer to the second vertical wall portions 14. On the other hand, a second upper ball guide 17a having substantially an arc-shaped cross section protruding inward and diagonally downward is formed in an upper-end region (tip-end region) of each extending wall portion 17.

Figure 4:
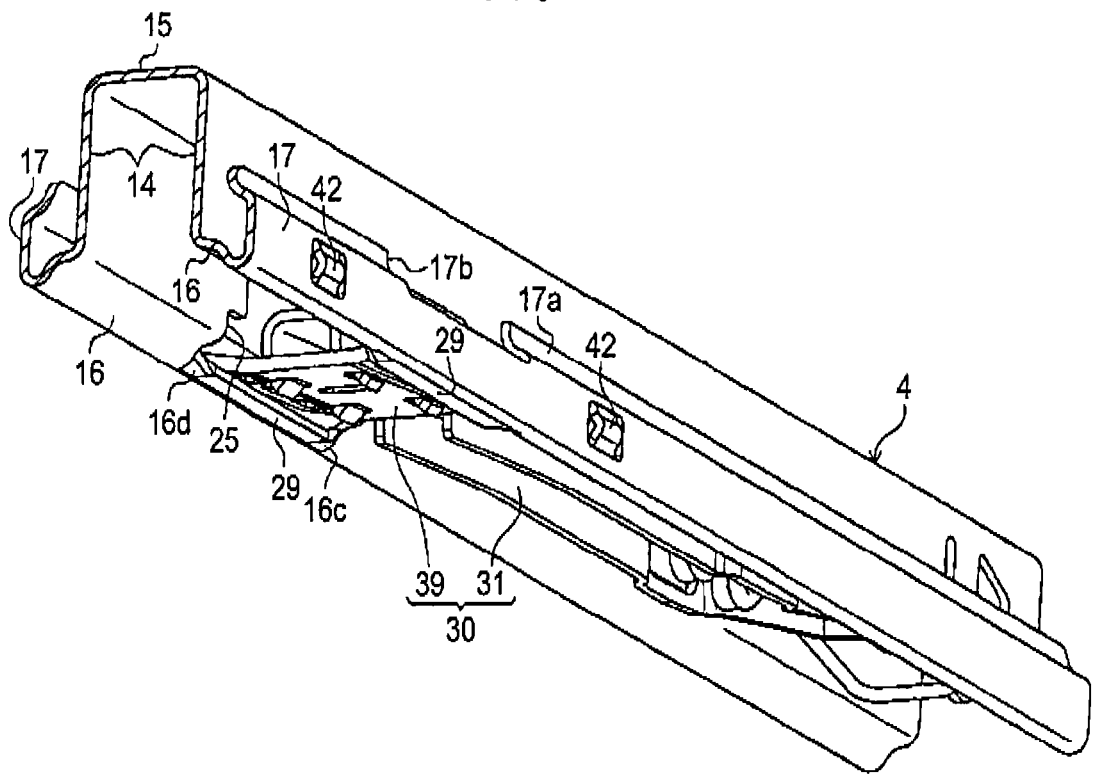
FIG. 4 is a perspective view of the embodiment disclosed here.

As are shown in FIGS. 3An and 3B and FIG. 4, the upper rail 4 is provided with through-holes 25 penetrating the respective second vertical wall portions 14 in the width direction and penetrating the respective outward extending wall portions 16 in the top-bottom direction in a center portion in the longitudinal direction sandwiched between second stoppers 42 in the front-rear direction. More specifically, a part (inner portion in the width direction) of the second lower ball guide 15a is notched by the through-hole 25. As is shown in a larger scale in FIG. 5, each through-hole 25 forms an intermediate opening 26 in an intermediate portion in the front-rear direction and also forms a rear-end opening 27 and a front-end opening 28 penetrating, respectively, a rear-end lower part and a front-end lower part of the intermediate opening 26. Upper ends 26a, 27a, and 28a of the intermediate opening 26, the rear-end opening 27, and the front-end opening 28, respectively, extend substantially horizontally in the front-rear direction. The upper ends 27a and 28a of the rear-end opening 27 and the front-end opening 28, respectively, are flush with each other and located below the upper end 26a of the intermediate opening 26 in the top-bottom direction. That is, an opening width of the rear-end opening 27 and the front-end opening 28 in the top-bottom direction is reduced to the lower side with respect to an opening width of the intermediate opening 26 in the top-bottom direction.

Figure 6A:
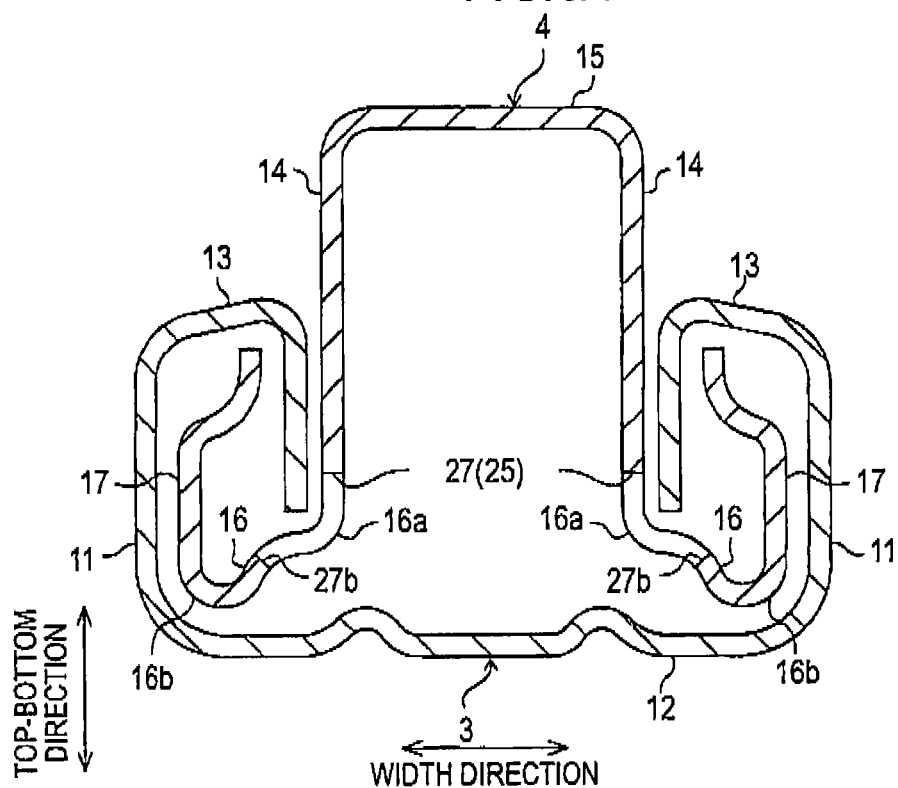
FIG. 6A and FIG. 6B are cross-sectional views taken VIA-VIA line and VIB-VIB line in FIG. 5, respectively.

Also, as is shown in FIG. 6A, the rear end of the rear-end opening 27 conforms to the sectional shape of the outward extending wall portions 16. Hence, a region in the width direction between the outer end 16b of the outward extending wall portion 16 and the outer end 27b of the rear-end opening 27 projects inward while coming closer to the lid wall portion 15 in the top-bottom direction. More specifically, the outer end 27b of the rear-end opening 27 rises above the outer end 16b of the outward extending wall portion 16 at the rear end of the rear-end opening 27. The same applies to the front end of the front-end opening 28 (the illustration is omitted here).

Figure 6B:
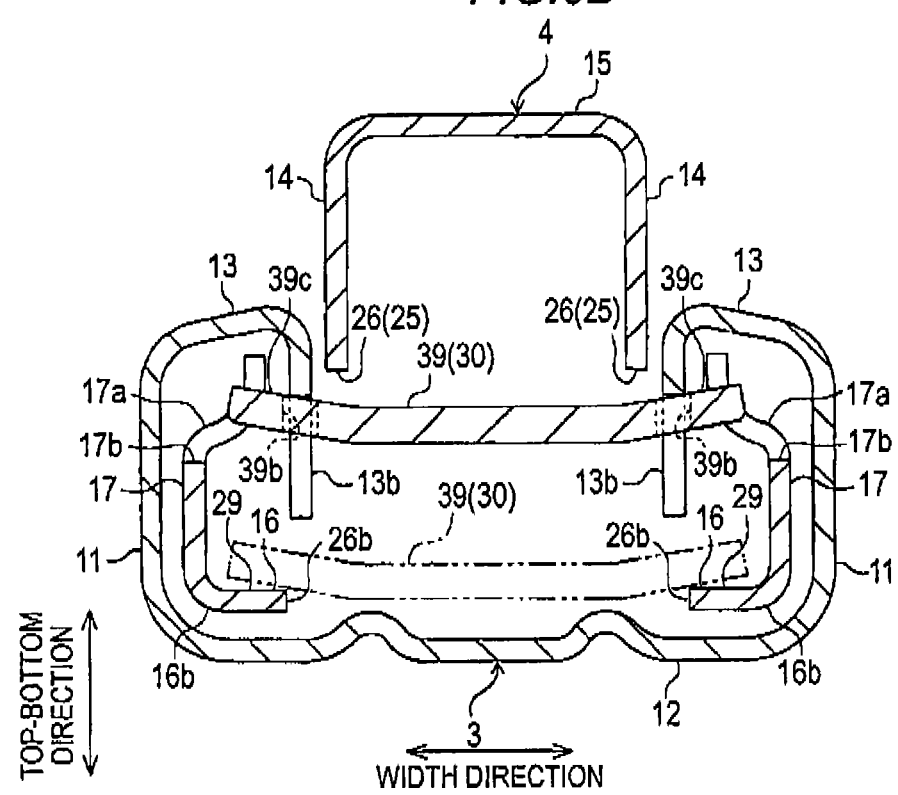

On the other hand, as is shown in FIG. 6B, a region in the width direction between the outer end 16b of the outward extending wall portion 16 and the outer end 26b of the intermediate opening 26 extends horizontally and forms a flat portion 29. More specifically, substantially across the entire intermediate opening 26 in the front-rear direction, the flat portion 29 positions the outer end 26b of the intermediate opening 26 to be flush in the top-bottom direction with the outer end 16b of the outward extending wall portion 16 that comes in closest proximity to the bottom wall portion 12 (moves farthest away from the lid wall portion 15) in the top-bottom direction.

Figure 5:
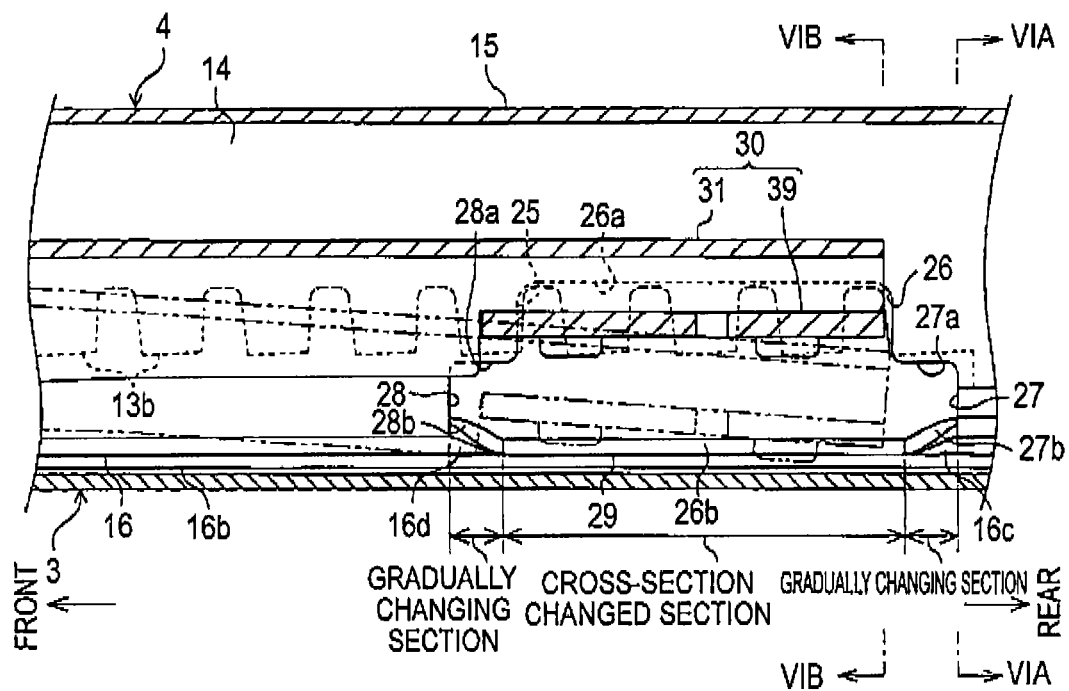
FIG. 5 is a vertical cross-sectional view of the embodiment disclosed here to describe an operation thereof.

As is shown in FIG. 5, substantially in the range of the rear-end opening 27 in the front-rear direction, a region in the width direction between the outer end 16b of the outward extending wall portion 16 and the outer end 27b of the rear-end opening 27 forms a gradually changing portion 16c that gradually conforms a sectional shape of the outward extending wall portion 16 at the rear end of the rear-end opening 27 to a sectional shape in the flat portion 29. Likewise, substantially in the range of the front-end opening 28 in the front-rear direction, a region in the width direction between the outer end 16b of the outward extending wall portion 16 and the outer end 28b of the front-end opening 28 forms a gradually changing portion 16d that gradually conforms a sectional shape of the outward extending wall portion 16 at the front end of the front-end opening 28 to the sectional shape in the flat portion 29. The gradually changing portions 16c and 16d change the sectional shapes of the outward extending wall portion 16 (upper rail 4) at the rear end of the rear-end opening 27 and the front end of the front-end opening 28 into the sectional shape of the outward extending wall portion 16 having the flat portion 29 without generating excess large stress.

That is to say, a range of the outward extending wall portion 16 in the front-rear direction in the through-hole 25 is divided to a cross-section changed section in which the flat portion 29 is disposed and a pair of gradually changing sections in which the gradually changing portions 16c and 16d are disposed. A range of the cross-section changed section in the front-rear direction as a whole is set slightly more rearward than the range of the intermediate opening 26 in the front-rear direction.

As is shown in FIG. 6B, a notch 17b of substantially a rectangular shape is formed in an upper-end region (the second upper ball guide 17a) of each extending wall portion 17 of the upper rail 4 at a position corresponding to the through-hole 25 in the longitudinal direction. Each notch 17b opens upward and penetrates the upper end region in the width direction.

Also, as is shown in FIG. 3A, each extending wall portion 17 is provided with a pair of second stoppers 42 sandwiching the through-hole 25 in front and behind. The second stoppers 42 of the extending wall portions 17 are located symmetrically in the width direction and formed apart from each other by protruding outward in the width direction. The second stoppers 42 provided to each extending wall portion 17 are sandwiched between a pair of the first stoppers 41 disposed apart from each other in the front-rear direction.

Each second stopper 42 is disposed so as to block a movement trajectory of the first stopper 41 in the front-rear direction. Hence, a forward movement of the upper rail 4 with respect to the lower rail 3 is locked as the first stoppers 41 in the front-end portion of the lower rail 3 and the second stoppers 42 in the center portion closer to the front end of the upper rail 4 abut on each other. Contrarily, a backward movement of the upper rail 4 with respect to the lower rail 3 is locked as the first stoppers 41 in the rear-end portion of the lower rail 3 and the second stoppers 42 in the center portion closer to the rear end of the upper rail 4 abut on each other. Owing to this configuration, a relative movable range (slide stroke) of the lower rail 3 and the upper rail 4 is limited.

As is shown in FIG. 2, a lower ball 20a as a spherical ball is interposed in a space between each second lower ball guide 16a and the opposing first lower ball guide 18a. Likewise, an upper ball 20b is interposed in a space between each second upper ball guide 17a and the opposing first upper ball guide 13c. As is shown in FIG. 3A, two lower balls 20a are provided so as to sandwich each through-hole 25 in front and behind, that is, eight lower balls 20a are provided in the right and left in total. Likewise, two upper balls 20b are provided so as to sandwich each through-hole 25 in front and behind, that is, eight upper balls 20b are provided in the right and left in total. The upper rail 4 is supported on the lower rail 3 and allowed to slide in the longitudinal direction (front-rear direction) in such a manner that the respective balls 20a and 20b roll in the spaces between the upper rail 4 and the lower rail 3.

When the lower rail 3 and the upper rail 4 move in the front-rear direction, the lower balls 20a and the upper balls 20b also move in the same direction. On the other hand, the first lower ball guides 18a (ridges 18) are not formed at the front end and the rear end of the lower rail 3. Also, the second lower ball guides 16a are absent in the range of the through-holes 25 in the front-rear direction. The second upper ball guides 17a are absent in the range of the notches 17b in the front-rear direction. Within the relative movable range of the lower rail 3 and the upper rail 4 limited by the engagement of the first and second stoppers 41 and 42, it is set in such a manner that the lower balls 20a and the upper balls 20b are prevented from moving into these ranges.

As is shown in FIG. 3B, end portions of a column-shaped supporting shaft 22, a center line of which extends in the width direction in front of the through-holes 25, are firmly fixed to and supported on the respective second vertical wall portions 14. A lock lever 30 is connected in the upper rail 4 on the inner side of the second vertical wall portions 14 in the width direction in a rotationally movable manner by the supporting shaft 22. More specifically, the lock lever 30 includes a handle portion 31 formed of a plate material extending in the front-rear direction. The handle portion 31 is provided so as to stand in such a manner that a pair of vertical wall portions 32 extending in the longitudinal direction is aligned side by side in the width direction. A distance in the width direction between the vertical wall portions 32 is set to be shorter than a distance in the width direction between the second vertical wall portions 14 of the upper rail 4. Upper-end edges of the vertical wall portions 32 are connected in the width direction by a connection wall 33 at the respective front ends. Also, the upper-end edges are connected in the width direction by a top board portion 34 at the respective rear ends.

Long holes 35 extending in the front-rear direction at positions as high as the supporting shaft 22 are provided to the respective vertical wall portions 32. An opening width in a short direction (top-bottom direction) of the long hole 35 is set to be equal to the diameter of the supporting shaft 22. The supporting shaft 22 is inserted into the long holes 35 while the vertical wall portions 32 of the handle portion 31 are sandwiched in the width direction between the second vertical wall portions 14 of the upper rail 4. Owing to this configuration, the handle portion 31 is connected to the upper rail 4 in a rotationally movable manner in the top-bottom direction while being allowed to move in the front-rear direction within the range of the long holes 35.

The handle portion 31 has a pair of insertion shape portions 36 and 37 extending forward from the front ends of the respective vertical wall portions 32. The insertion shape portions 36 and 37 are reduced to the lower side below the front ends of the vertical wall portions 32 and come closer oppositely to each other in the width direction so that the one overlaps the other to form a handle insertion portion 38.

Also, the lock lever 30 includes a lock plate 39 as a flat plate portion formed of a plate material and firmly fixed to a lower part in the rear-end portion of the handle portion 31. The lock plate 39 expands in the front-rear direction and the width direction so as to pass through the through-holes 25 (intermediate openings 26) and the notches 17b in the width direction. As is shown in FIG. 6B, the lock plate 39 is provided with locking holes 39b as locking portions that open in the top-bottom direction oppositely to the respective flanges 13. A plurality of (three) locking holes 39b are provided side by side in the front-rear direction at the regular intervals and located at positions at which the locking holes 39b can fit onto the plurality of (three) locking claws 13b provided to the lower rail 3 adjacently in the longitudinal direction.

As is indicated by a solid line in FIG. 6B, the corresponding locking claws 13b can be fit into the respective locking holes 39b when the lock lever 30 rotationally moves about the supporting shaft 22 to raise the lock plate 39. When the corresponding locking claws 13b are fit into the respective locking holes 39b, a relative movement of the lower rail 3 and the upper rail 4 is locked. On the other hand, as is indicated by an alternate long and two short dashes line in FIG. 68, it is set in such a manner that the respective locking holes 39b come off the corresponding locking claws 13b when the lock lever 30 rotationally moves about the supporting shaft 22 to lower the lock plate 39. In this instance, the locking of a relative movement of the lower rail 3 and the upper rail 4 is unlocked.

A dimension of the lock plate 39 in the width direction is set to be greater than a distance in the width direction between the second upper ball guides 17a of the upper rail 4 and to be less than a distance in the width direction between the extending wall portions 17 located below the second upper ball guides 17a. Hence, although the lock plate 39 passes through the through-holes 25 in the width direction while a relative movement of the lower rail 3 and the upper rail 4 is locked, the lock plate 39 does not interfere with the extending wall portions 17 while the locking of the relative movement is unlocked.

Also, a dimension of the lock plate 39 in the width direction is set to be greater than a distance in the width direction between the outer ends 26b of the intermediate openings 26 (through-holes 25). Hence, a rotational movement of the lock lever 30 to a side where the locking of a relative movement is unlocked is limited to the extent that the rear end of the lock plate 39 abuts on the outer ends 26b of the intermediate openings 26. Nevertheless, basically in the forming range of the intermediate openings 26 (through-holes 25), the flat portion 29 positions the outer ends 26b of the intermediate openings 26 to be flush in the top-bottom direction with the outer ends 16b of the outward extending wall portions 16 that come in closest proximity to the bottom wall portion 12 in the top-bottom direction. Hence, a rotationally movable range (stroke) of the lock lever 30 is increased comparably, for example, as the outer ends 26b of the intermediate openings 26 are lowered below the rear end of the outer end 27b of the rear-end opening 27.

In particular, the both edge portions of the lock plate 39 in the width direction form inclined portions 39*c* directed upward toward the outer side in the width direction. The outer ends 26*b* of the respective intermediate openings 26 oppose these inclined portions 39*c* in the top-bottom direction. Hence, the rotationally movable range of the lock lever 30 is increased further comparably as the lock plate 39 comes down along the inclined portions 39*c* on the inner side in the width direction than the abutment position at which the rear end of the lock plate 39 (inclined portions 39*c*) abuts on the outer ends 26*b*. FIG. 6B obviously shows that while the rear end of the lock plate 39 (inclined portions 39*c*) abuts on the outer ends 26*b*, the center portion in the width direction sandwiched between the outer ends 26*b* is positioned below the outer ends 26*b*.

As are shown in FIGS. 3A and 3B, a lock spring 50 formed of a single linear material is disposed in the upper rail 4. The lock spring 50 is formed substantially in the shape of a capital U that opens frontward when viewed in a plane. The lock spring 50 has a wedge portion 53 formed by bending an intermediate portion in the longitudinal direction upward and also has a lever locking end portion 54 formed by bending the rear-end portion upward. The lock spring 50 is supported on the upper rail 4 as the supporting shaft 22 is inserted and pinched in the wedge portion 53 from above the supporting shaft 22 and the lever locking end portion 54 is inserted into and fixed to the lock plate 39 from below the lock plate 39.

In this instance, the lock spring 50 biases and rotates the lock lever 30 to a side where the lock plate 39 lifts up in the lever locking end portion 54, that is, to a side where the corresponding locking claws 13*b* fit in the respective locking holes 39*b*. Also, the lock spring 50 locks a movement of the supporting shaft 22 in the front-rear direction within the long holes 35 by biasing the supporting shaft 22 downward, that is, in a direction crossing the longitudinal direction of the long holes 35, in the wedge portion 53 using a reactive force. In short, the position of the supporting shaft 22 in the front-rear direction within the long holes 35 is maintained as the supporting shaft 22 is biased by the wedge portion 53 of the lock spring 50.

The unlocking handle 6 is shaped by bending a tubular material and connected to the lock lever 30 as the unlocking handle 6 is inserted into the upper rail 4 from the front-end opening end of the upper rail 4 and the handle insertion portion 38 is inserted therein. Hence, the unlocking handle 6 basically rotates integrally with the lock lever 30 about the supporting shaft 22. A slit-like supporting groove 62 extending in the width direction is formed in a lower part of the unlocking handle 6 where the handle insertion portion 38 is inserted.

A handle spring 65 formed of a single linear material is disposed in the upper rail 4. The handle spring 65 is formed substantially in the shape of a capital U opening rearward when viewed in a plane. The front-end portion of the handle spring 65 is fit into the supporting groove 62 of the unlocking handle 6 in which the handle insertion portion 38 is inserted and the rear-end portion abuts on the lower surface of the top board portion 34 of the lock lever 30 (handle portion 31) in a more rear part of the vehicle than the supporting shaft 22. The unlocking handle 6 is biased to rise by the handle spring 65 in the supporting groove 62.

A posture of the unlocking handle 6 is controlled as the front-end portion of the handle insertion portion 38 inserted therein is supported swingably in the top-bottom direction in front of the supporting groove 62 (that is, a position at which the unlocking handle 6 is biased by the handle spring 65) and the unlocking handle 6 is biased upward by the handle spring 65 in the supporting groove 62.

When the front end of the unlocking handle 6 lifts up, the lock lever 30 together with the unlocking handle 6 rotationally moves about the supporting shaft 22 against a biasing force of the lock spring 50 to a side where the lock plate 39 come down, that is, to a side where the respective locking holes 39*b* come off the corresponding locking claws 13*b*.

Assume that the unlocking handle 6 is released from an operation force. In this instance, a relative movement of the lower rail 3 and the upper rail 4 is locked in the same manner as described above as the lock lever 30 together with the unlocking handle 6 rotationally moves about the supporting shaft 22 due to a biasing force of the lock spring 50 to a side where the lock plate 39 to rise, that is, to a side where the respective locking holes 39*b* fit onto the corresponding locking claws 13*b*. A position in the front-rear direction of the seat 5 supported on the upper rails 4 is thus held.

Assume that the unlocking handle 6 is operated later so that the front end lifts up. In this instance, the locking of a relative movement of the lower rail 3 and the upper rail 4 is unlocked in the same manner as described above as the lock lever 30 together with the unlocking handle 6 rotationally moves about the supporting shaft 22 against a biasing force of the lock spring 50 to a side where the lock plate 39 comes down, that is, to a side where the respective locking holes 39*b* come off the corresponding locking claws 13*b*. It thus becomes possible to adjust a position in the front-rear direction of the seat 5 supported on the upper rails 4.

A function of the embodiment disclosed here will now be described.

A rotational movement of the lock lever 30 to the side for the locking of a relative movement to be unlocked is limited to the extent that the lock plate 39 abuts on the flat portions 29 (outer ends 26*b* of the intermediate openings 26). The flat portions 29 make the abutment position of the lock plate 39 and the flat portions 29 in association with the rotational movement of the lock lever 30 flush in the top-bottom direction with the outer ends 16*b* of the outward extending wall portions 16 that come in closest proximity to the bottom wall portion 12 in the top-bottom direction (the position at which the lock plate 39 relatively comes closer to the bottom wall portion 12 in the top-bottom direction). In this case, for example, even when the lock plate 39 cannot pass through the intermediate openings 26 (through-holes 25) entirely in the top-bottom direction, it becomes possible to increase the rotationally movable range (stroke) of the lock lever 30.

As has been described in detail above, the embodiment disclosed here can obtain the advantages as follows.

(1) In the embodiment disclosed here, for example, even when the lock plate 39 cannot pass through the intermediate openings 26 (through-holes 25) entirely in the top-bottom direction, the rotationally movable range of the lock lever 30 can be increased. It thus becomes possible to suppress deterioration of strength of the upper rail 4 caused by the through-holes 25 while suitably securing the rotationally movable range of the lock lever 30.

(2) In the embodiment disclosed here, each outward extending wall portion 16 is provided with the gradually changing portions 16*c* and 16*d*, respectively, at the rear end and the front end of the flat portion 29. Different sectional shapes are gradually conformed to each other at the rear end and the front end of the flat portion 29 by the gradually changing portions 16*c* and 16*d*, respectively. It thus becomes possible to suppress the occurrence of excess large stress in the outer extending wall portions 16 (upper rail 4) in association with the formation of the flat portion 29.

(3) In a case where the embodiment disclosed here is applied to so-called a power seat for which the lower rails 3 and the upper rails 4 are moved relatively by electrical power, power is transmitted from the former to the latter and vice versa by threading nuts provided to one of the lower rails 3 and the upper rails 4 onto screws provided to the other. In this case, torque rods that make the nuts or the screws provided to a pair of the right and left upper rails 4 operate in association are passed through the second vertical wall portions 14 using step portions in the top-bottom direction between the flanges 13 of the respective lower rails 3 and the lid wall portions 15 of the respective upper rails 4. In the embodiment disclosed here, the outward extending wall portions 17 and the first vertical wall portions 11 are not increased in the top-bottom direction for the purpose of securing the rotationally movable range of the lock lever 30. Accordingly, a distance in the top-bottom direction of the step portions is secured suitably. It thus becomes possible to dispose the torque rods, for example, without having to increase the sectional shape of the upper rails 4 in the top-bottom direction.

(4) In the embodiment disclosed here, the lower balls 20a are interposed between the first lower ball guides 18a disposed substantially directly below the second vertical wall portions 14 of the upper rail 4 and the second lower ball guides 16a disposed on the outer side than the first lower ball guide 18a in the width direction (inner portions of the outward extending wall portions 16 in the width direction). Hence, in a case where the lower rail 3 and the upper rail 4 are compressed in the top-bottom direction, for example, by an impact, the upper rail 4 makes an attempt to undergo deformation so that the lower portions of the second vertical wall portions 14 open in the width direction while being introduced by the lower balls 20a. Such deformation of the upper rail 4 is, however, limited by the first vertical wall portions 11 of the lower rail 3 sandwiching the upper rail 4 in the width direction. It thus becomes possible to suppress deformation of the upper rail 4 when the lower rail 3 and the upper rail 4 are compressed in the top-bottom direction. In addition, a direction of deformation of the upper rail 4 in this instance is not a direction in which the upper rail 4 comes off the lower rail 3. It thus becomes possible to suppress the upper rail 4 from coming off the lower rail 3.

(5) In the embodiment disclosed here, a clearance is set between the connection region of the bottom wall portion 12 and the first vertical wall portion 11 of the lower rail 3 and the connection region of the outward extending wall portion 16 and the outward extending wall portion 17 of the upper rail 4 so that balls are not interposed as in the related art. Hence, for example, by adjusting the clearance by changing the sectional shape of the lower rail 3 or the upper rail 4, it becomes possible to control deformation of the lower rail 3 or the upper rail 4 with ease.

(6) In the embodiment disclosed here, it is configured in such a manner that a load in the top-bottom direction is received by the lower balls 20a disposed substantially directly below the second vertical wall portions 14 of the upper rail 4. Owing to this configuration, rigidity in this direction can be enhanced.

(7) In the embodiment disclosed here, a rotational movement of the lock lever 30 to the side for the locking of a relative movement to be unlocked can be limited to the extent that the rear end of the lock plate 39 abuts on the outer ends 26b of the intermediate openings 26. This configuration eliminates the need to separately provide a stopper that limits the rotational movement of the lock lever 30, for example, to the unlocking handle 6 or a peripheral component. Hence, the number of components can be reduced.

(8) In the embodiment disclosed here, the lower rail 3 is fixed to the vehicle floor 2 with the fastening bolt 21 in the attaching portion 12a of the bottom wall portion 12. On the other hand, the upper rail 4 is connected to the lower rail 3 in a relatively movable manner so that the lower balls 20a roll in the spaces between the first lower ball guides 18a and the second lower ball guides 16a. Because the second lower ball guides 16a of the upper rail 4 are formed in the inner portions of the outward extending wall portions 16 in the width direction, a clearance in the top-bottom direction between the upper rail 4 and the bottom wall portion 12 increases toward the center in the width direction particularly at the position of the attaching portion 12a in which the first lower ball guides 18a (ridges 18) are not formed. Hence, with the use of this increasing clearance in the top-bottom direction, it becomes possible to dispose the fastening bolt 21 (head portion 21b) to the attaching portion 12a without the need of forming a mounting part in the bottom wall portion 12. It thus becomes possible to reduce a sectional shape of the lower rail 3, and hence, a sectional shape of the entire apparatus in the top-bottom direction.

(9) In the embodiment disclosed here, the fastening bolt 21 (head portion 21b) is disposed to the attaching portion 12a without the need of seat extrusion in the bottom wall portion 12. Owing to this configuration, a clearance in the top-bottom direction between the lower rail 3 and the upper rail 4 can be reduced. It thus becomes possible to suppress a rotational movement to the side for the lock plate 39 to come down by an impact or the like, that is, to the side for the respective locking holes 39b to come off the corresponding locking claws 13b.

(10) Generally, a belt anchor forming a terminal of the seat belt is attached to either one of a pair of the upper rails 4 on the right and left. Hence, for example, when a large load in the front-rear direction is inputted to the belt anchor in case of a vehicle crash, right-left asymmetrical deformation occurs in the vehicle body, for example, in the vehicle floor 2 and the right and left upper rails 4 may possibly be twisted relatively. In this instance, there is a possibility that the right and left lock levers 30 maintain the posture due to rigidity of the unlocking handles 6 so that the lock levers 30 (lock plates 39) rotationally move relatively in a direction to unlock the locking with the locking claws 13b. In the embodiment disclosed here, however, the fastening bolt 21 (head portion 21b) is disposed to the attaching portion 12a without providing a seat extrusion in the bottom wall portion 12. It thus becomes possible to reduce a clearance in the top-bottom direction between the bottom wall portion 12 of the lower rail 3 and the second vertical wall portions 14 of the upper rails 4 and a rotational movement of the lock lever 30 (lock plate 39) in the direction to unlock the locking can be suppressed comparably.

The embodiment disclosed here may be modified as follows.

Figure 7A:
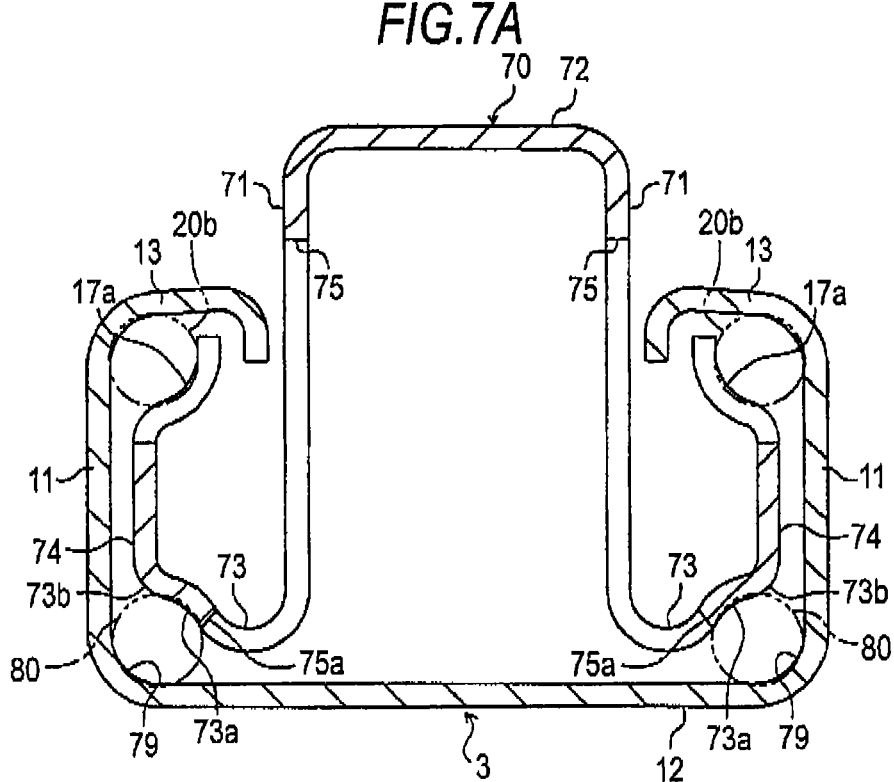
FIG. 7A and FIG. 7B are lateral cross-sectional views of a modification of the embodiment disclosed here.
Figure 7B:
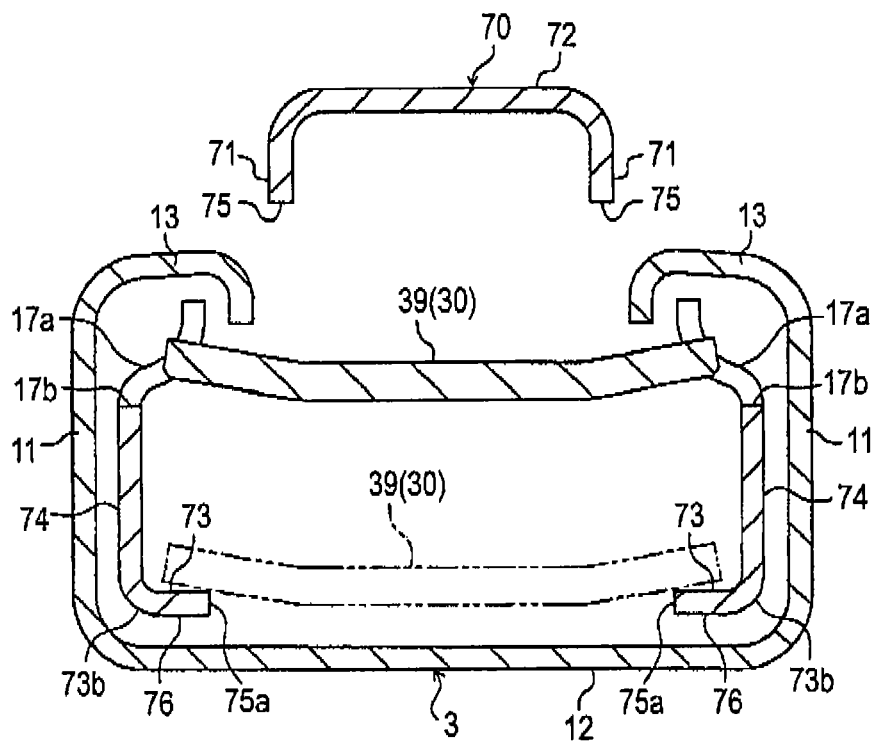

The vehicle seat sliding apparatus may be a vehicle seat sliding apparatus configured as are shown in FIG. 7A and FIG. 7B. That is, the ridges 18 (first lower ball guides 18a) are omitted from the lower rail 3. A connection region of each first vertical wall portion 11 and the bottom wall portion 12 forms a first lower ball guide 79 as a first ball guide of substantially an arc shape in cross section that protrudes outward and diagonally downward.

On the other hand, an upper rail 70 is formed of a plate material and has a pair of second vertical wall portions 71 extending in the top-bottom direction between the flanges 13 of the lower rail 3 and a lid wall portion 72 as a second connection wall portion connecting base ends (upper ends) of the second vertical wall portions 71 away from the lower rail 3. A pair of outward extending wall portions 73 are continuously formed from the tip ends (lower ends) of the second vertical well portions 71 in close proximity to the bottom wall portion 12 so as to project outward apart from each other in the width direction while moving apart from the bottom wall portion 12 in the top-bottom direction. Also, a pair of extending wall portions 74 extending in the top-bottom direction so as to be surrounded by the first vertical wall portions 11 and the flanges 13 are continuously formed from the tip ends (outer ends 73b in the width direction) of the outward extending wall portions 73. An outer part of each outward extending wall portion 73 in the width direction forms a second lower ball guide 73a as a second ball guide of substantially an arc shape in cross section that protrudes inward and diagonally upward.

The upper rail 70 is provided with through-holes 75 penetrating the respective second vertical wall portions 71 in the width direction and penetrating the respective outward extending wall portions 73 in the top-bottom direction in a center portion in the longitudinal direction (front-rear direction). That is, a part (inner portion in the width direction) of the second lower ball guide 73a is notched by the through-hole 75.

Also, as is shown in FIG. 7A, the rear end of the through-hole 75 conforms to the sectional shape of the outward extending wall portions 16 in the non-forming range of the through-hole 75 in the front-rear direction. Hence, a region in the width direction between the outer end 73b of the outward extending wall portion 73 and the outer end 75a of the through-hole 75 projects inward while moving apart from the lid wall portion 72 in the top-bottom direction. More specifically, the outer end 75a of the through-hole 75 comes down below the outer end 73b of the outward extending wall portion 73 at the rear end of the through-hole 75. The same applies to the front end of the through-hole 75 (the illustration is omitted here).

On the other hand, as is shown in FIG. 7B, a region in the width direction between the outer end 73b of the outward extending wall portion 73 and the outer end 75a of the through-hole 75 extends horizontally and forms a flat portion 76 in the intermediate portion of the through-hole 75 in the front-rear direction. It should be noted, however, that in the forming range of the through-holes 75 in the front-rear direction, the outer end 73b of the outward extending wall portion 73 together with the flat portion 76 is at a position in the top-bottom direction in closer proximity to the bottom wall portion 12 than the normal outer ends 73b in the non-forming range of the through-holes 75.

A gradually changing portion (not shown) to gradually conform a sectional shape at the rear end of the through-hole 75 to a sectional shape in the flat portion 76 may be provided at the rear end of the flat portion 76 or the gradually changing portion may not be provided at all. The same applies to the front end of the flat portion 76.

A lower ball 80 as a spherical ball is interposed in a space between each second lower ball guide 73a and the opposing first lower ball guide 79. It goes without saying that it is set in such a manner that the lower ball 80 is prevented from moving into the range of the through-hole 75 in the front-rear direction in which the second lower ball guides 73a are absent within a relative movable range of the lower rail 3 and the upper rail 70 limited by the engagement of the first and second stoppers 41 and 42.

As has been described, a rotational movement of the lock lever 30 to the side for the locking of the relative movement to be unlocked is limited to the extent that the lock plate 39 abuts on the flat portions 76 (outer ends 75a of the through-holes 75). Also, because the flat portions 76 are at positions at which the flat portions 76 relatively come closer to the bottom wall portion 12 in the top-bottom direction in the same manner as above, the abutment position of the flat portions 79 and the lock plate 39 in association with the rotational movement of the lock lever 30 is also a position relatively closer to the bottom wall portion 12 in the top-bottom direction. In this case, for example, even when the lock plate 39 cannot pass through the through-holes 75 entirely in the top-bottom direction, the rotationally movable range of the lock lever 30 can be increased. It thus becomes possible to suppress deterioration of strength of the upper rail 70 caused by the through-holes 75 while suitably securing the rotationally movable range of the lock lever 30.

Figure 8:
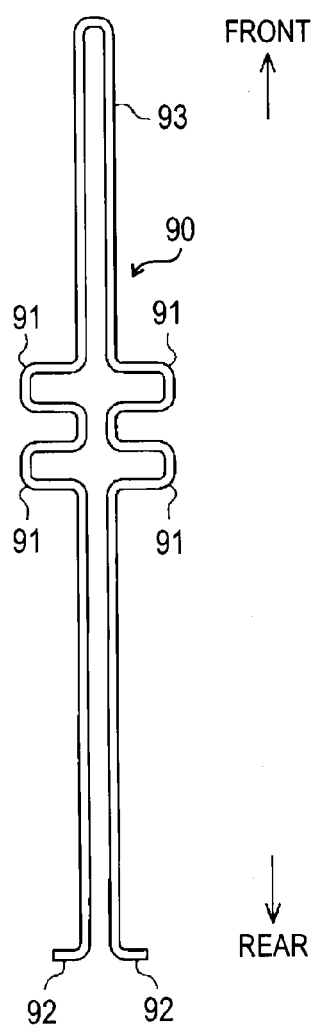
FIG. 8 is a plan view of a modification of the embodiment disclosed here.
Figure 9:
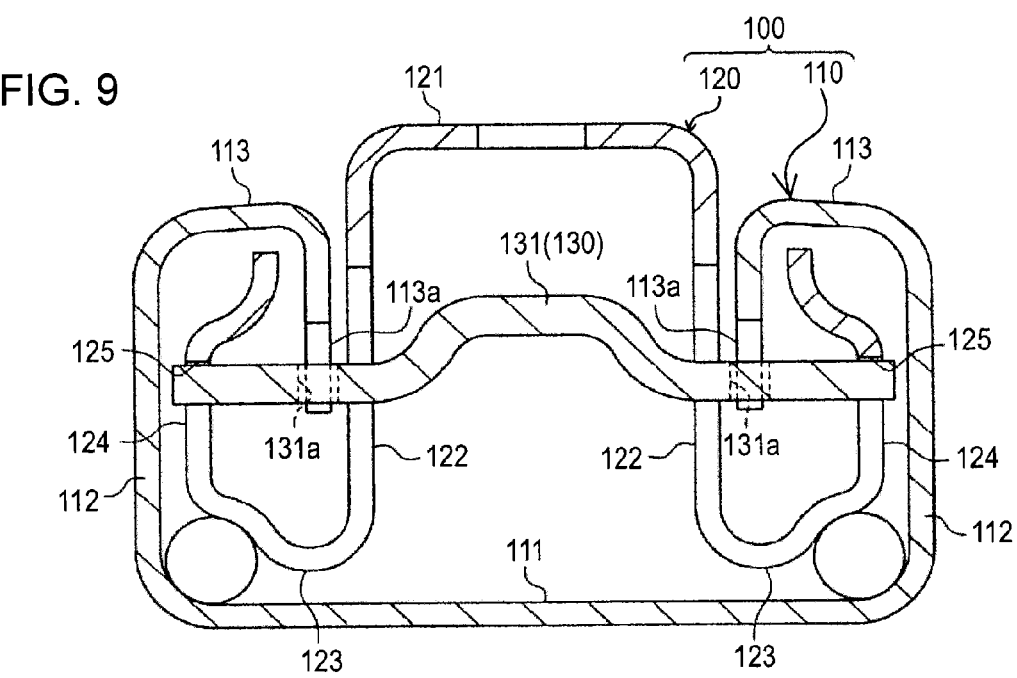
FIG. 9 is a lateral cross-sectional view of the related art.
Figure 10:
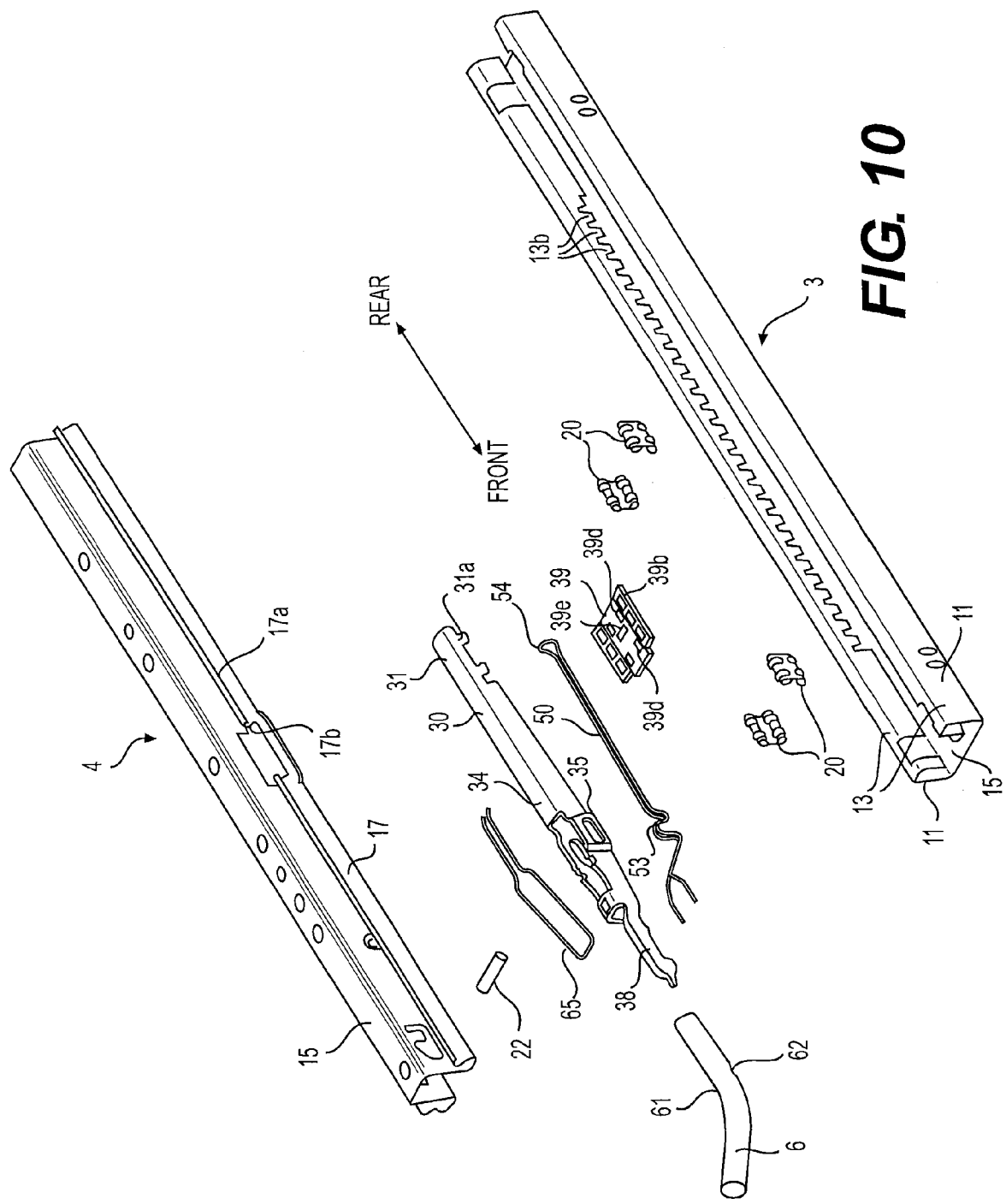
FIG. 10 is a perspective view of an embodiment of the present application.
Figure 11:
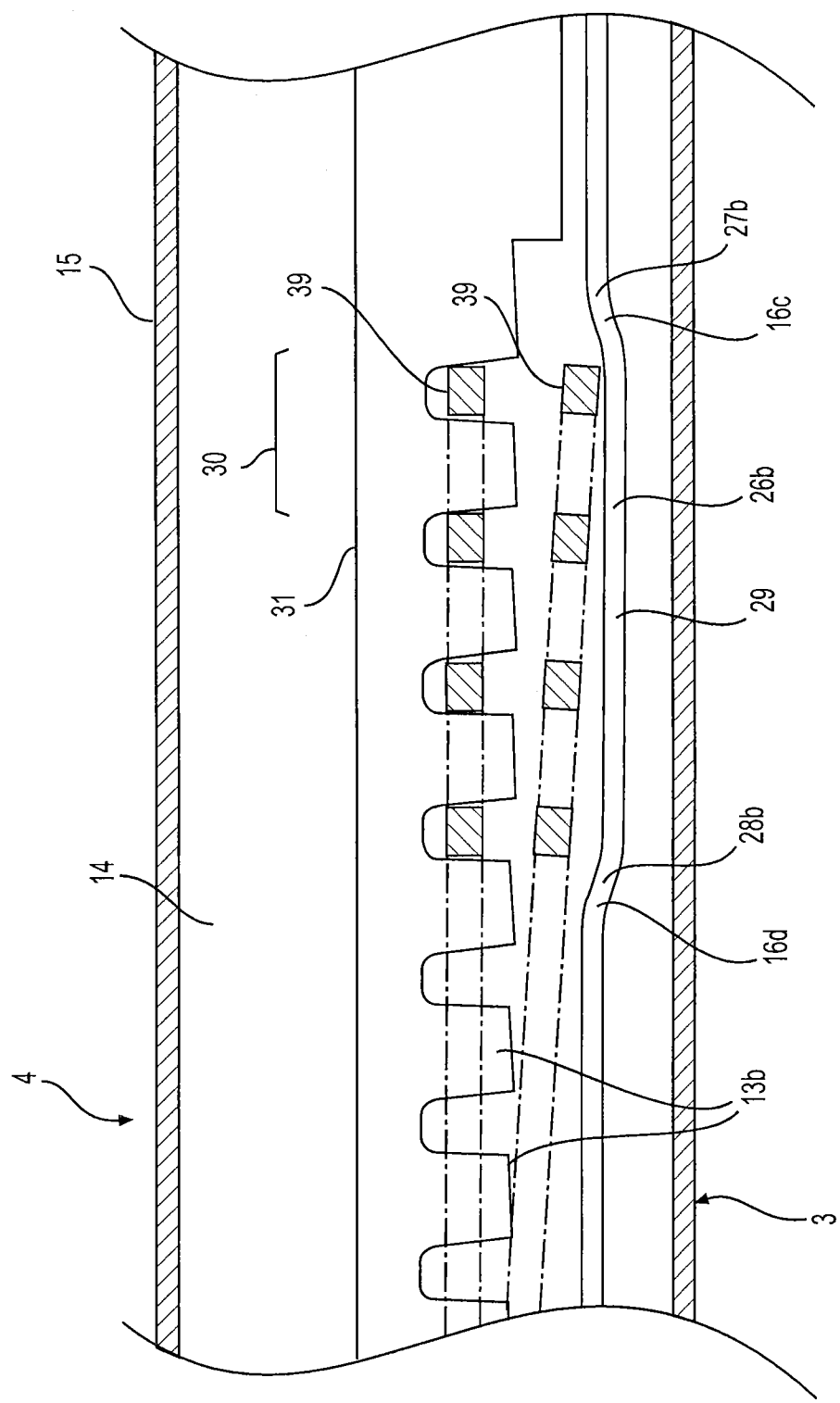
FIG. 11 is a vertical cross-sectional view of an embodiment of the present application.
Figures 12A, 12B:
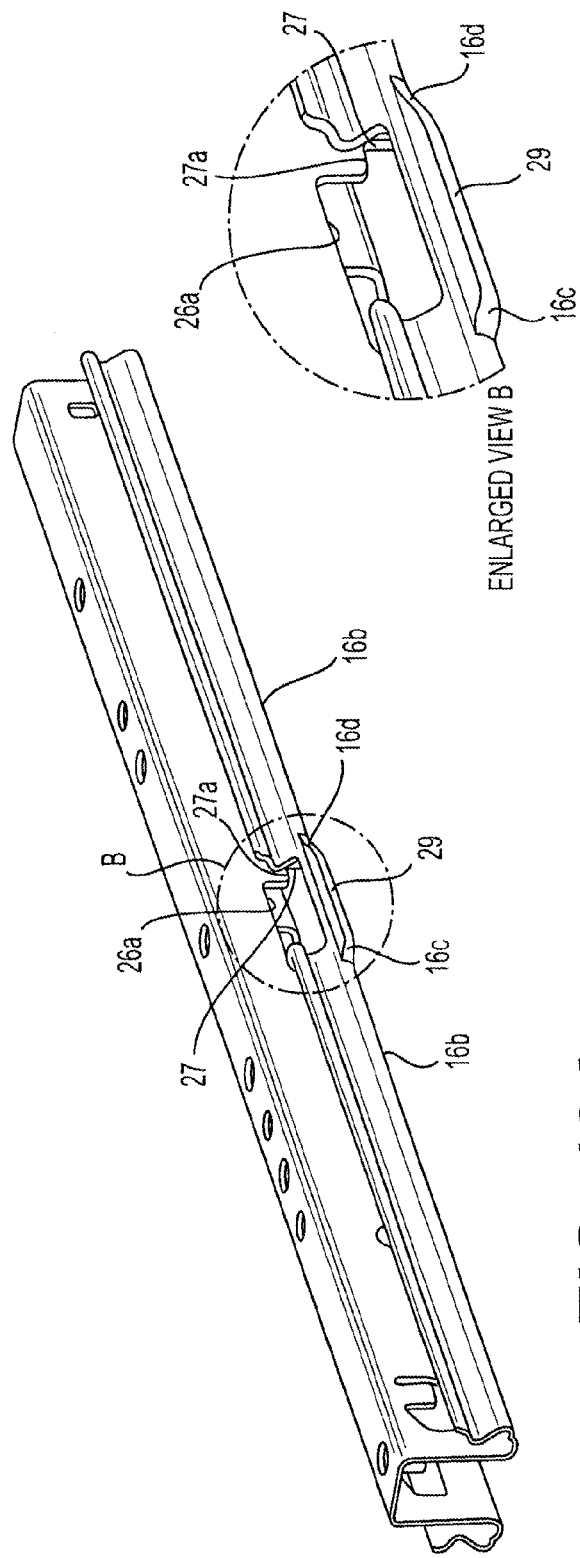
FIG. 12*a* is a perspective view with an enlarged portion (FIG. 12*b*) of an embodiment of the present application.

A lock lever 90 formed of a single linear material functioning as the locking member and also as the biasing member as is shown in FIG. 8 may be used instead. More specifically, the lock lever 90 is formed substantially in the shape of a capital U opening rearward when viewed in a plane. The lock lever 90 has locking portions 91 of substantially a rectangular shape protruding outward to the both sides in the width direction in a center portion in the longitudinal direction. The locking portions 91 disposed on each side in the width direction are aligned side by side in pairs at a regular interval in the front-rear direction.

Also, both terminals of the lock lever 90 extending rearward are bent outward to the both sides in the width direction and form a pair of right and left hinge pins 92. The lock lever 90 is disposed between the second vertical wall portions 14 and the hinge pins 92 are inserted therein in a rotationally movable manner. The lock lever 90 is thus connected to the upper rail 4 in a rotationally movable manner in the top-bottom direction.

On the other hand, the lock lever 90 forms a handle insertion portion 93 in a closed region extending forward from the locking portions 91. The lock lever 90 basically rotates integrally with the unlocking handle (6) as the handle insertion portion 93 is inserted into the unlocking handle.

When configured in this manner, the lock lever 90 is biased to rotationally move to a side where the corresponding locking claws 13b fit into the respective locking portions 91 with its own biasing force while the unlocking handle is free from an operation force and holds a predetermined posture. In this instance, a relative movement of the lower rail 3 and the upper rail 4 is locked.

On the other hand, when the unlocking handle is operated, the lock lever 90 is rotationally moved to a side where the corresponding locking claws 13b come off the respective locking portions 91 while undergoing elastic deformation. In this instance, the locking of a relative movement of the lower rail 3 and the upper rail 4 is unlocked.

Modifications as follows can particularly reduce the number of components.

In the embodiment disclosed here, the position of the outer ends 16b of the outward extending wall portions 16 in the top-bottom direction in the forming range of the intermediate openings 26 (through-holes 25) in the direction of a relative movement (front-rear direction), that is, the position of the flat portions 29 in the top-bottom direction, does not necessarily coincide with the position of the outer ends 16b of the normal outward extending wall portions 16 in the top-bottom direction in a condition that the through-holes 25 are not provided. Importantly, it is sufficient that the abutment position of the lock plate 39 on the flat portions 29 in association with a rotational movement of the lock lever 30 to the side for the locking of the relative movement to be unlocked falls on a position relatively closer to the bottom wall portion 12 in the top-bottom direction than the original abutment position of the lock plate 39 on the outward extending wall portions 16 having a sectional shape comforting to a normal sectional shape in a condition that the flat portions 29 are not formed.

In the embodiment disclosed here, when the flat portions 29 can be shaped by the through-holes 25 without any interruption from the normal outward extending wall portions 16 having no flat portions 29, at least one of the gradually changing portions 16c and 16d may be omitted.

In the embodiment disclosed here, the lower rails 3 may be fastened to the vehicle floor 2 using, for example, caulking pins as fastening members. Alternatively, the lower rails 3 may be fastened to the vehicle floor 2 via appropriate brackets.

In the embodiment disclosed here, the ridge 18 (first lower ball guide 18a) may include a plurality of ridges 18 disposed to the bottom wall portion 12 at intervals in the longitudinal direction as long as a movable range of the lower balls 20a is included.

In the embodiment disclosed here, the lock plate 39 may be a flat lock plate from which the inclined portions 39c are omitted.

In the embodiment disclosed here, a lock lever may be formed of a single plate material in which the handle portion and the lock plate are formed integrally.

In the embodiment disclosed here, the locational relation of the upper rail 4 and the lock lever 30 with respect to the supporting shaft 22 and the long holes 35 may be reversed.

In the embodiment disclosed here, it may be configured in such a manner that circular holes are provided to the lock lever 30 (handle portion 31) instead of the long holes 35, so that the lock lever 30 is connected to the upper rail 4 in a rotationally movable manner by inserting the supporting shaft 22 into the circular holes. The locational relation of the upper rail 4 and the lock lever 30 with respect to the supporting shaft 22 and the circular holes may be reversed.

In the embodiment disclosed here, the lower rail 3 may be a structure formed of a plurality of plate materials connected by welding or the like.

In the embodiment disclosed here, the upper rails 4 and 70 may be a structure formed of a plurality of plate materials connected by welding or the like.

In the embodiment disclosed here, appropriate sliding members or rollers may be adopted instead of the upper balls 20b. Alternatively, the upper balls 20b and the supporting structure thereof may be omitted.

In the embodiment disclosed here, the stationary relation of the lower rails 3 and the upper rails 4 or 70 with respect to the vehicle floor 2 and the seat 5 (that is, the locational relation as to which rail is fixed above the other) may be reversed. In this case, an operation to unlock the lock lever 30 provided to the vehicle floor 2 may be performed, for example, from an appropriate operation member via a cable.

In the embodiment disclosed here, one lower rail 3 and one upper rail 4 or 70 (vehicle seat sliding apparatus) may be disposed with respect to one seat 5, or three or more lower rails 3 and three or more upper rails 4 or 70 may be disposed with respect to one seat 5.

In the embodiment disclosed here, a relative movement direction of the lower rail and the upper rail may be, for example, a direction of the vehicle width.

A technical idea that can be understood from the embodiment and modifications disclosed here will now be described additionally.

The vehicle seat sliding apparatus may be configured in such a manner that: the first ball guides are provided to an intermediate portion of the first rail in the direction of a relative movement; and the vehicle seat sliding apparatus includes an attaching portion disposed at a tip end of the first connection wall portion in the direction of a relative movement where the first ball guides are not formed and forming a seating surface for a fastening member that fixes the first rail to the vehicle floor or the seat.

According to this configuration, the first rail is fixed to the vehicle floor or the seat by the fastening member in the attaching portion of the first connection wall portion. On the other hand, the second ball guides of the second rail are provided to the outward extending wall portions in the inner portions in the width direction. Hence, a clearance in the top-bottom direction between the second rail and the first connection wall portion increases toward the center in the width direction particularly at the position of the attaching portion in which the first ball guides are not formed. Hence, with the use of this increasing clearance in the top-bottom direction, the fastening member can be disposed to the attaching portion without the need of seat extrusion in the first connection wall portion. It thus becomes possible to reduce a sectional shape of the first rail, and hence a sectional shape of the entire apparatus in the top-bottom direction.

An aspect of this disclosure provides a vehicle seat sliding apparatus including: a first rail fixed to one of a vehicle floor and a seat and having a pair of first vertical wall portions aligned side by side in a width direction, a first connection wall portion connecting base ends of the first vertical wall portions, and a pair of flanges projecting from tip ends of the first vertical wall portions inwardly in the width direction in which the flanges face each other and further bending toward the base ends of the first vertical wall portions; and a second rail fixed to the other one of the vehicle floor and the seat in a relatively movable manner with respect to the first rail and having a pair of second vertical wall portions aligned side by side in the width direction between the flanges, a second connection wall portion connecting base ends of the second vertical wall portions, a pair of outward extending wall portions projecting outward apart from each other in the width direction from tip ends of the second vertical wall portions while undergoing displacement to one side in a top-bottom direction, and a pair of extending wall portions extending in the top-bottom direction from tip ends of the outward extending wall portions so as to be surrounded by the first vertical wall portions and the flanges. A plurality of locking claws are aligned side by side in the direction of the relative movement at tip ends of the flanges of the first rail. The second rail is provided with a pair of through-holes penetrating the second vertical wall portions in the width direction and penetrating the outward extending wall portions in the top-bottom direction. The vehicle seat sliding apparatus further includes: a locking member connected to the second rail in a rotationally movable manner about an axial line extending in the width direction on an inner side of the second vertical wall portions in the width direction, formed in an insertable manner into the through-holes in the second vertical wall portions, having locking portions capable of locking at least a part of the locking claws in side edge portions in the width direction, and selectively locking the relative movement of the first and second rails as the locking portions fit onto and come off the locking claws in association with a rotational movement in the top-bottom direction; and a biasing member biasing and rotating the locking member to a side where the relative movement is locked. The outward extending wall portions are provided with a pair of flat portions making a region between outer ends of the outward extending wall portions in the width direction and the through-holes horizontally in the width direction so that an abutment position of the outward extending wall portions and the locking member in association with a rotational movement of the locking member comes closer to the first connection wall portion in the top-bottom direction.

According to this configuration, a rotational movement of the locking member to the side for the locking of the relative movement to be unlocked is limited to the extent that the locking member abuts on the flat portions. The abutment position of the outward extending wall portions and the locking member in association with the rotational movement of the locking member falls on a position relatively closer to the first connection wall portion in the top-bottom direction than the flat portions. In this case, for example, even when the locking member cannot pass through the through-holes in the top-bottom direction, the rotationally removable range of the locking member can be increased. It thus becomes possible to suppress deterioration of strength of the second rail caused by the through-holes while suitably securing the rotationally movable range of the locking member.

In the vehicle seat sliding apparatus, it is preferable that the respective outer extending wall portions are provided with a gradually changing portion that gradually conform different sectional shapes to each other at least on one side of the flat portions in the direction of the relative movement.

According to this configuration, different sectional shapes are gradually conformed to each other by the gradually changing portion on the corresponding side of the flat portions in the direction of the relative movement. It thus becomes possible to suppress the occurrence of excess large stress in the outward extending portions (second rail) in association with the formation of the flat portions.

In the vehicle seat sliding apparatus, it is preferable that the outward extending wall portions project outward in the width direction while coming closer to the first connection wall portion in the top-bottom direction, and that a pair of balls are interposed in a rollable manner between a pair of second ball guides provided to the outward extending wall portions in inner portions in the width direction and a pair of first ball guides provided to the first connection wall portion so as to protrude in the top-bottom direction in a direction in which the first ball guides come closer to the second vertical wall portions on an inner side than the second ball guides in the width direction.

In the vehicle seat sliding apparatus, it is preferable that the outward extending wall portions project outward in the width direction while moving apart from the first connection wall portion in the top-bottom direction, and that a pair of balls are interposed in a rollable manner between a pair of first ball guides provided to connection regions of the first vertical wall portions and the first connection wall portion and a pair of second ball guides provided to connection regions of the outward extending wall portions and the extending wall portions.

This disclosure has an advantage that it becomes possible to suppress deterioration of strength of a rail caused by through-holes while suitably securing a rotationally movable range of the locking member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus, comprising:
a first rail fixed to one of a vehicle floor and a seat and having a pair of first vertical wall portions aligned side by side in a width direction, a first connection wall portion connecting base ends of the first vertical wall portions, and a pair of flanges projecting from tip ends of the first vertical wall portions inwardly in the width direction in which the flanges face each other and further bending toward the base ends of the first vertical wall portions; and
a second rail fixed to the other one of the vehicle floor and the seat in a relatively movable manner with respect to the first rail and having a pair of second vertical wall portions aligned side by side in the width direction between the flanges, a second connection wall portion connecting base ends of the second vertical wall portions, a pair of outward extending wall portions projecting outward apart from each other in the width direction from tip ends of the second vertical wall portions while undergoing displacement to one side in a top-bottom direction, and a pair of extending wall portions extending in the top-bottom direction from tip ends of the outward extending wall portions so as to be surrounded by the first vertical wall portions and the flanges,
wherein
a plurality of locking claws are aligned side by side in the direction of the relative movement at tip ends of the flanges of the first rail;
the second rail is provided with a pair of through-holes penetrating the second vertical wall portions in the width direction and penetrating the outward extending wall portions in the top-bottom direction;
the vehicle seat sliding apparatus further comprises,
a locking member connected to the second rail in a rotationally movable manner about an axial line extending in the width direction on an inner side of the second vertical wall portions in the width direction, formed in an insertable manner into the through-holes in the second vertical wall portions, having locking portions capable of locking at least a part of the locking claws in side edge portions in the width direction, and selectively locking the relative movement of the first and second rails as the locking portions fit onto and come off the locking claws in association with a rotational movement in the top-bottom direction, and
a biasing member biasing and rotating the locking member to a side where the relative movement is locked;
the outward extending wall portions are provided with a pair of flat portions making a region between outer ends of the outward extending wall portions in the width direction and the through-holes horizontally in the width direction so that an abutment position of the outward extending wall portions and the locking member in association with a rotational movement of the locking member comes closer to the first connection wall portion in the top-bottom direction,
the respective outer extending wall portions are provided with a gradually changing portion that gradually conforms different sectional shapes to each other at least on one side of the flat portions in the direction of the relative movement, and
the gradually changing portion is inclined downward toward the flat portion from the outer ends of the outward extending wall portions.

2. The vehicle seat sliding apparatus according to claim 1, wherein:
- the outward extending wall portions project outward in the width direction while coming closer to the first connection wall portion in the top-bottom direction; and
- a pair of balls is interposed in a rollable manner between a pair of second ball guides provided to the outward extending wall portions in inner portions in the width direction and a pair of first ball guides provided to the first connection wall portion so as to protrude in the top-bottom direction in a direction in which the first ball guides come closer to the second vertical wall portions on an inner side than the second ball guides in the width direction.

3. The vehicle seat sliding apparatus according to claim 1, wherein:
- the outward extending wall portions project outward in the width direction while moving apart from the first connection wall portion in the top-bottom direction; and
- a pair of balls are interposed in a rollable manner between a pair of first ball guides provided to connection regions of the first vertical wall portions and the first connection wall portion and a pair of second ball guides provided to connection regions of the outward extending wall portions and the extending wall portions.

* * * * *